United States Patent [19]
Rubinstein

[11] Patent Number: 6,069,361
[45] Date of Patent: May 30, 2000

[54] IMAGING RESOLUTION OF X-RAY DIGITAL SENSORS

[75] Inventor: Roger B. Rubinstein, Rochester, N.Y.

[73] Assignee: Eastman Kodak Company, Rochester, N.Y.

[21] Appl. No.: 08/961,832

[22] Filed: Oct. 31, 1997

[51] Int. Cl.$^7$ ...................................................... G21K 4/00
[52] U.S. Cl. ................................ 250/370.11; 250/370.09; 250/366; 250/367; 250/368
[58] Field of Search ........................... 250/370.11, 370.09, 250/366, 367, 368

[56] References Cited

U.S. PATENT DOCUMENTS

| | | | |
|---|---|---|---|
| 5,109,159 | 4/1992 | Hagiwara et al. | 250/366 |
| 5,220,170 | 6/1993 | Cox et al. | |
| 5,391,879 | 2/1995 | Tran et al. | |
| 5,880,470 | 3/1999 | Umetani et al. | 250/370.09 |

*Primary Examiner*—Constantine Hannaher
*Assistant Examiner*—Andrew Israel
*Attorney, Agent, or Firm*—William F. Noval

[57] ABSTRACT

An improved solid-state detector for use in a digital X-Ray imaging system. The detector includes two or more silicon CCDs that are sandwiched together with phosphor screens or layers between them in order to improve the overall sensitivity of the detector to X-rays. In order to improve the resolution of the device, the CCDs are offset relative to one another so that the pixels of one cover the nonsensing portions of the other. The phosphorescent screen is combined with an opaque mask containing holes corresponding to positions of the pixels in the CCDs. This arrangement improves image quality by preventing light resulting from an X-ray striking the phosphorescent screen in a particular location from "bleeding" and exposing adjacent pixels. One such screen is placed on each side of the phosphorescent layer with holes aligned with the corresponding CCD, or the screen can be affixed directly to the CCD prior to assembly of the device, or "spots" of the phosphorescent material can be applied directly to the CCDs over each pixel.

14 Claims, 2 Drawing Sheets

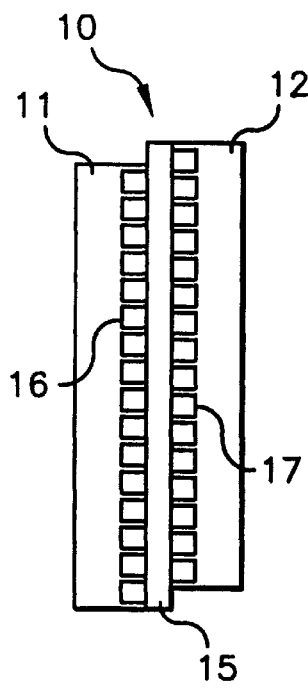
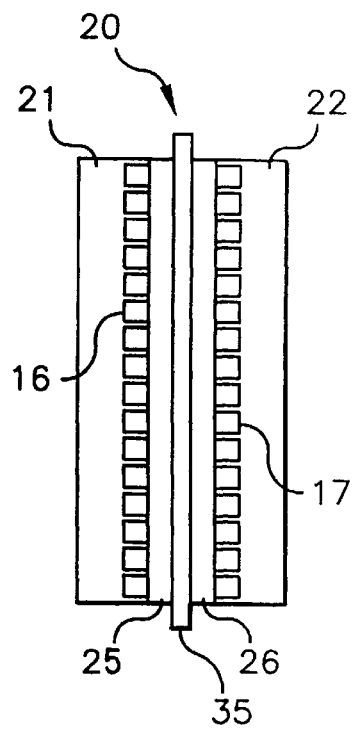
FIG. 1A FIG. 1B
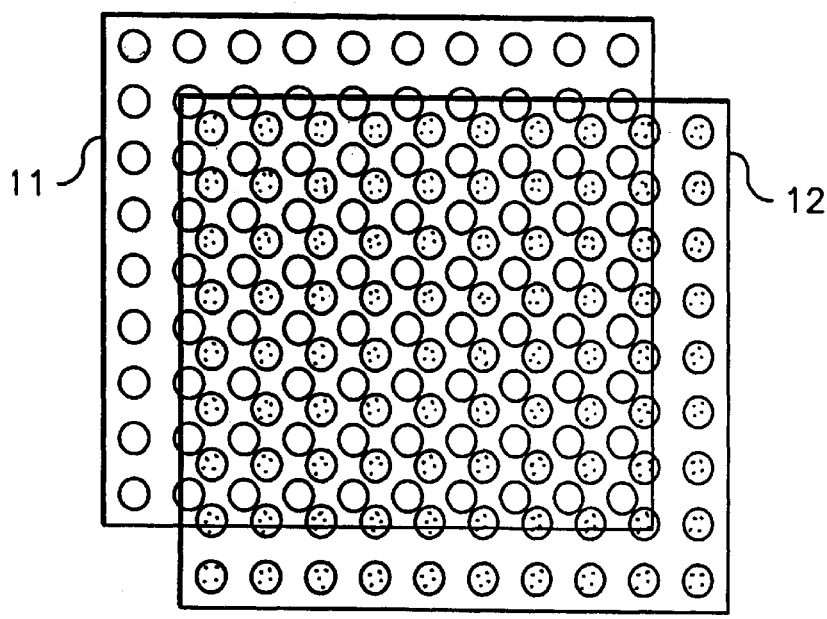
FIG. 2A

IMAGING RESOLUTION OF X-RAY DIGITAL SENSORS

FIELD OF THE INVENTION

The invention relates generally to the field of X-Ray sensors and in particular to increasing the resolution of digital X-Ray sensors.

BACKGROUND OF THE INVENTION

U.S. Pat. No. 5,391,879 to Tran et al. discloses a radiation detector which includes an array 16 of pixelized sensors 15 and an overlying array 12 of phosphor pixels 11 with a fiber optic network in between (elements 17 and 17 in FIG. 1). See Col. 1, lines 10–23. This reference discloses one layer of sensor elements rather than a pair of sensor arrays on either side of a phosphor layer. Therefore, this device suffers from loss of efficiency due to loss of a portion of the light emanating from the phosphor layer in a direction away from the pixelized sensors.

U.S. Pat. No. 5,220,170 to Cox et al. discloses an X-ray imaging system and a solid state detector used therewith. FIG. 16 shows a scintilator positioned between two layers, one containing a sensor element and another containing preprocessors. See Col. 1, lines 25–30.

From the foregoing discussion, it should be apparent that the prior art devices suffer from a loss in resolution because the spaces between adjacent pixels are not active as detectors. The present invention is directed to overcoming one or more of the problems set forth.

SUMMARY OF THE INVENTION

A solid-state X-ray detector for use in a digital X-Ray imaging system wherein a detector employs a phosphorescent layer to convert x-radiation to visible light and have the visible light detected by an image sensing device. The preferred embodiment employs silicon charge coupled devices (CCDs) "sandwiched" face-to-face with a phosphor screen or phosphor layer between them to enhance overall sensitivity of the device to X-rays. X-rays normally would pass through a CCD device and not be efficiently detected. X-rays striking the phosphor layer in this detector will generate visible light which will then be efficiently detected by the surrounding CCDs (FIG. 1).

In a related embodiment, the two CCDs are offset relative to one another so that the pixels of one cover the spaces between the pixels of the other, thereby increasing the resolution of the device. In a multiple sensor array embodiment, the sensor arrays can be placed next to, and offset from, each other to further increase the resolution, or allow additional predetermined bandwidths to be captured, or both.

In a further related embodiment, the phosphorescent screen is combined with an opaque mask containing holes corresponding to the positions of the pixels in the CCDs. This improves image quality by preventing light resulting from an X-ray striking the screen in a particular location from "bleeding" and exposing adjacent pixels. One screen is placed on each side of the phosphorescent layer with holes aligned with the corresponding CCD. Or, alternatively, the screen is affixed directly to the CCD prior to assembly of the device, or "spots" of phosphor material are applied directly to the CCDs over each pixel to substitute for the screen.

Briefly summarized, one aspect of this invention will provide the means of capturing high-resolution X-Ray images onto sensors including a solid state X-ray detector comprising: a plurality of pixellated array sensors each sensitive to a bandwidth selected for that sensor; a phosphorescent layer applied to at least one of the sensors and aligned with the pixels of that sensor, the phosphorescent layer being sensitive to X-rays and emitting light in response to X-rays within the bandwidth of the sensor to which it is applied.

These and other aspects, objects, features, and advantages of the present invention will be more clearly understood and appreciated from a review of the following detailed description of the preferred embodiments and appended claims, and by reference to the accompanying drawings.

Advantageous Effect Of The Invention

The present invention offers the following advantages: 1) enhanced efficiency of X-Ray detection by summing the response of multiple layers of pixels surrounding a phosphor layer; 2) increased resolution resulting from multiple sensor arrays positioned to overlap spaces between pixels; 3) the possibility of generating images from multiple X-Ray bandwidths simultaneously.

BRIEF DESCRIPTION OF THE DRAWINGS

FIG. 1 is a side view of the sensor as envisioned by the present invention;

FIG. 2A is a front view of the sensor of FIG. 1 without the phosphor screen;

To facilitate understanding, identical reference numerals have been used, where possible, to designate identical elements that are common to the figures.

DETAILED DESCRIPTION OF THE INVENTION

Figure 2B:
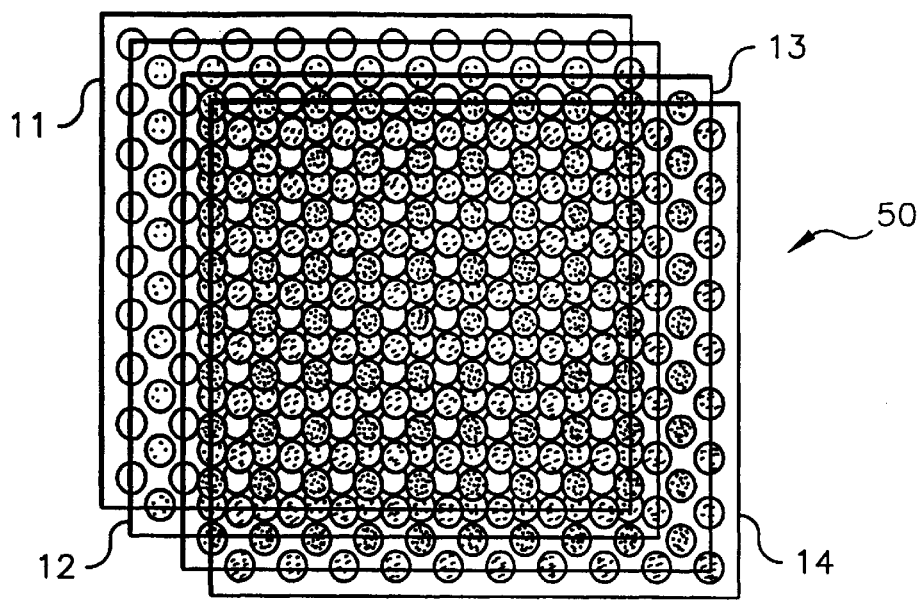
FIG. 2B is a side view of multiple sensors added sequentially as envisioned by the present invention.

In this invention, it has been discovered that "sandwiching" at least two silicon sensors with phosphorescent screen(s) can provide a novel way of increasing the resolution of detected X-rays. Referring to FIG. 1A, the sensor 10 has two individual sensors that are generally referred to as first and second pixellated arrays 11, 12 sensitive, respectively, to essentially the same bandwidth. The first and second pixellated arrays 11, 12 are arranged such that the pixels 17 of the second sensor 12 are facing the pixels 16 of the first sensor 11. A phosphorescent layer 15 sensitive to X-rays and emitting light within the bandwidth is sandwiched in between the pixellated arrays 11, 12. The sensor 10 has the first and second pixellated arrays 11, 12 offset to achieve a higher resolution sensor 10 from two lower resolution pixellated arrays 11, 12. The preferred embodiment of the sensor 10 that is shown in FIG. 1A is to the offset the pixellated arrays 11, 12 equal to x/2, y/2 where x represents the distance between two adjacent pixels on the first pixellated array along the x axis and y represents the distance between two adjacent pixels on the first pixellated array along the y axis.

The pixellated arrays 11, 12 are silicon based solid state image sensors, preferably charge coupled devices (CCDs). The concept of having lower resolution sensors employed in banks to create a high resolution sensor has cost advantages over use of a single high resolution sensor which is a very high cost component. This is especially true of CCDs where there is a non-linear increase in cost with increases in resolution.

Using this method, X-rays will pass through both the silicon based pixellated arrays 11, 12 and phosphorescent layer 15, which is envisioned as a coating in FIG. 1A. The phosphorescent layer 15 can be placed as a coating adjacent to the pixellated arrays 11, 12 which form sensor 10 to convert X-rays to visible light. If two pixellated arrays 11, 12 are placed face-to-face with a phosphorescent layer 15 as a screen in between them, both pixellated arrays 11, 12 will detect X-rays passing through them. This alone has implications for enhancing the "image" by summing the equivalent of respective pixels 16, 17 on each pixellated array sensor 11, 12.

Referring to FIG. 1B, the sensor 20 has first and second pixellated arrays 21, 22 sensitive, respectively, to first and second predetermined bandwidths. However, in this embodiment there are two phosphorescent layers 25, 26 that emit light for first and second bandwidths that are not identical. Accordingly, the first and second pixellated arrays 21, 22 are sensitive to light within the first and second bandwidths, respectively. It is envisioned that multiple stacks of sensors can be created in this manner. The first and second pixellated array 21, 22 are arranged such that the pixels 17 of the second pixellated array 22 are facing the pixels 16 of the first pixellated array 21. In this embodiment wherein there are two phosphorescent layers 25, 26 they are separated by a screen 35 that is opaque to visible light but transparent to X-rays. Stacked sensor embodiments are also envisioned where the pixellated surfaces of the sensors do not face each other. Here screen 35 is not required.

In FIG. 2A, a front view of a specific embodiment of FIG. 1 the faces of pixellated arrays 11, 12 are offset relative to one another, so that the pixels of one cover the spaces between pixels of the other. Accordingly, this doubles the number of pixels available to capture the image without using a single more expensive sensor with greater pixel density.

Figure 3:
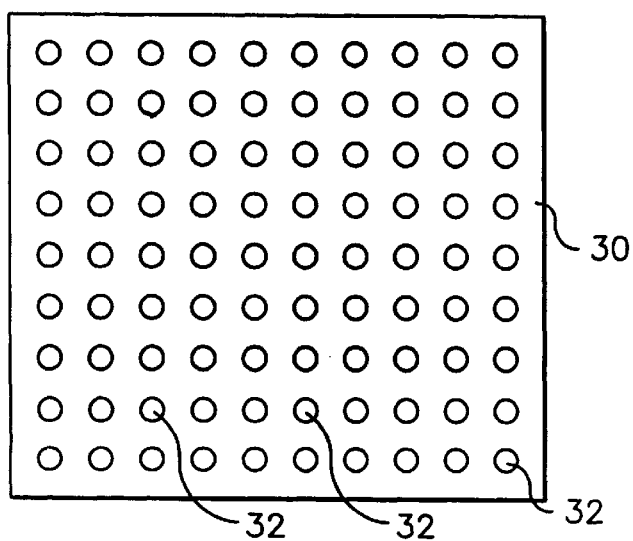
FIG. 3 is a diagram of an opaque mask containing holes.

Referring to FIG. 3, masks 30 can be interposed between the pixellated arrays 11, 12 and the phosphorescent layer 15 within the sensor 10 shown in FIGS. 1A and 2A to prevent bleeding of the light emitting from the phosphorescent screen when excited from activating pixels adjacent to the receiving pixel. To prevent this, masks 30 are interposed between the phosphor screen 15 and the pixellated arrays 11, 12 to create an opaque layer with an array of apertures to light 32 corresponding to each pixel position. Masking can be accomplished in two ways:

1. Put masks on each side of the phosphorescent screen, with the holes aligned with the positions of each element in the pixellated arrays.
2. Align and affix a mask to each pixellated array before the pixellated array is attached to the phosphorescent screen. This affords less of a problem in aligning the pixellated arrays vis-a-vis each other in order to double the resolution (as described above).

The mask 30 as shown in FIG. 3 could also be used within an embodiment having more then just two pixellated arrays, as shown FIG. 2B. In FIG. 2B one mask 30 would be employed upon each of the pixellated arrays 11, 12, 13, 14. One version of the embodiment shown in FIG. 2B would have a phosphorescent layer for each of the pixellated arrays. Another potential embodiment would have a plurality of pixellated array with the pixellated arrays arranged either for an increase in resolution or for sensitivity to a different bandwidth. Embodiments could employ the pixellated arrays 11, 12, 13, 14 with each array sensitive to a different bandwidth or with the pixellated arrays 11, 12, 13, 14 offset to increase resolution. The case where an increase in resolution may be as shown in FIG. 1A or still another embodiment could have each of the pixellated arrays facing in the same direction and offset as desired.

It is envisioned that the offsets between each pixellated array would be equal to $$\frac{(s-1)}{n}x, \frac{(s-1)}{n}y$$

where x represents the distance between two adjacent pixels along the x axis on the first pixellated array, y represents the distance between two adjacent pixels along the y axis on the first pixellated array, n equals the total number of pixellated arrays in the sensor, and s equals the current pixellated array being offset.

Figure 4:
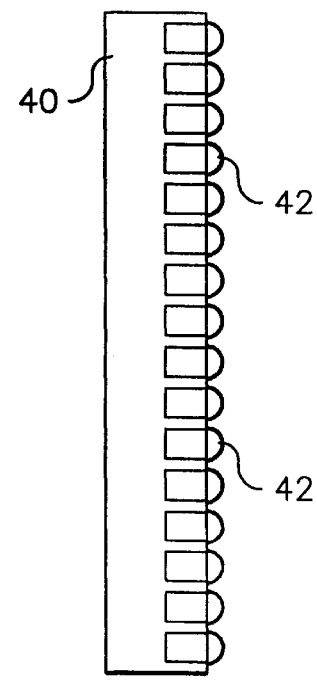
FIG. 4 is a diagram illustrating phosphor dots that can be employed with the present invention.

Referring to FIG. 4, an embodiment of the present invention having phosphor dots 42 used as a phosphor layer. Having phosphor dots 42 relieves the requirement of placing an opaque mask 30 as shown in FIG. 3 because each excited phosphor dot that is excited will be captured only by the pixel to which it is affixed. As shown in FIG. 4, the phosphor dots 42 would typically be applied to the face of the sensor 40 and accordingly require a phosphor dot applied to each sensor element within the pixellated array.

It will be understood by those skilled in the art that the previously described embodiments can be used in various combinations with each other.

The invention has been described in detail with particular reference to certain preferred embodiments thereof, but it will be understood that variations and modifications can be effected within the spirit and scope of the invention.

PARTS LIST 10 sensor
11 first pixellated array
12 second pixellated array
13 third pixellated array
14 fourth pixellated array
15 phosphorescent array
16 pixels
17 pixels
20 sensor
21 first pixellated array
22 second pixellated array
25 phosphorescent array
26 phosophorescent array
30 mask
32 apertures
35 opaque light mask
42 spots

What is claimed is:

1. A solid state X-ray detector comprising:
   a first pixellated array sensor sensitive to a first predetermined bandwidth;
   a second pixellated array sensor sensitive to a second predetermined bandwidth arranged such that the pixels of the second sensor are facing the pixels of the first sensor; and
   at least one phosphorescent layer sensitive to X-rays and emitting light within the first predetermined bandwidth and the second predetermined bandwidth sandwiched in between the sensors; wherein the first and second bandwidths are different, there are at least two phosphorescent layers with an opaque mask sandwiched between them, such that there is first phosphorescent layer emitting the first bandwidth, and a second phosphorescent layer emitting the second bandwidth.

2. The X-ray detector of claim 1 wherein the first and second pixellated sensors have arrays offset with respect to each other.

3. The X-ray detector of claim 2 wherein the offset is essentially x/2, y/2 where x represents the distance between two adjacent pixels on the first sensor along the x axis and y represents the distance between two adjacent pixels on the first sensor along the y axis.

4. The X-ray detector of claim 1 further comprising at least one mask adjacent to at least one of the sensors, the mask being opaque to the light emitted by the phosphorescent layer and having a plurality of apertures that are aligned with pixels in the sensor.

5. The X-ray detector of claim 1 wherein the phosphorescent layer emitting to the first predetermined bandwidth or the second predetermined bandwidth is applied to the sensor in a phosphor dot pattern that is aligned with at least the pixels of either the first or second sensors.

6. The X-ray detector of claim 1 wherein the first and second pixellated layers are offset with respect to each other.

7. A solid state X-ray detector comprising:

a plurality of pixellated arrays each sensitive to a bandwidth selected for the pixellated array wherein the bandwidths are different, a phosphorescent dot pattern applied to at least one of the pixellated arrays and aligned with the pixels of that pixellated array, the dot pattern being sensitive to X-rays and emitting light in response to X-rays within the bandwidth of the sensor to which it is applied.

8. The X-ray detector of claim 7 wherein at least two of the pixellated sensors are offset with respect to each other.

9. The X-ray detector of claim 8 wherein the offset is essentially $$\frac{(s-1)}{n}x, \frac{(s-1)}{n}y$$

where x represents the distance between two adjacent pixels along the x axis on the first pixellated array, y represents the distance between two adjacent pixels along the y axis on the first pixellated array, n equals the total number of pixellated arrays in the sensor, and s equals the current pixellated array being offset.

10. The X-ray detector of claim 1 further comprising at least one mask adjacent to at least one of the sensors, the mask being opaque to the light emitted by the phosphorescent layer and having a plurality of apertures that are aligned with pixels in the sensor to which it is adjacent.

11. A solid state X-ray detector comprising:

a plurality of pixellated array sensors each sensitive to bandwidth selected for the sensor wherein the bandwidths are different, a phosphorescent layer applied to at least one of the sensors and aligned with the pixels of that sensor, the phosphorescent layer being sensitive to X-rays and emitting light in response to X-rays within the bandwidth of the sensor to which it is applied.

12. The X-ray detector of claim 11 wherein at least two of the pixellated sensors are offset with respect to each other.

13. The X-ray detector of claim 11 wherein the offset is essentially $$\frac{(s-1)}{n}x, \frac{(s-1)}{n}y$$

where x represents the distance between two adjacent pixels along the x axis on the first pixellated array, y represents the distance between two adjacent pixels along the y axis on the first pixellated array, n equals the total number of pixellated arrays in the sensor, and s equals the current pixellated array being offset.

14. The X-ray detector of claim 11 further comprising at least one mask adjacent to at least one of the sensors, the mask being opaque to the light emitted by the phosphorescent layer and having a plurality of apertures that are aligned with pixels in the sensor to which it is adjacent.

* * * * *